(12) United States Patent
Asami

(10) Patent No.: US 7,684,127 B2
(45) Date of Patent: Mar. 23, 2010

(54) IMAGING LENS AND IMAGING DEVICE

(75) Inventor: Taro Asami, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/166,858

(22) Filed: Jul. 2, 2008

(65) Prior Publication Data

US 2009/0009888 A1  Jan. 8, 2009

(30) Foreign Application Priority Data

Jul. 5, 2007 (JP) ............................ P2007-176947
Jun. 2, 2008 (JP) ............................ P2008-144372

(51) Int. Cl.
*G02B 9/60* (2006.01)
*G02B 9/08* (2006.01)

(52) U.S. Cl. ..................... 359/770; 359/763; 359/740
(58) Field of Classification Search ................ 359/740, 359/762, 763, 770
See application file for complete search history.

(56) References Cited

U.S. PATENT DOCUMENTS

| 4,525,038 | A | 6/1985 | Muller |
| 5,933,286 | A | 8/1999 | Yamada et al. |
| 7,023,628 | B1 | 4/2006 | Ning |
| 2001/0028511 | A1* | 10/2001 | Sensui .................. 359/740 |
| 2005/0174463 | A1 | 8/2005 | Ohzawa et al. |
| 2007/0217035 | A1 | 9/2007 | Baba |

FOREIGN PATENT DOCUMENTS

| JP | 4-261510 A | 9/1992 |
| JP | 8-313802 A | 11/1996 |
| JP | 10-39206 A | 2/1998 |
| JP | 2002-98886 A | 4/2002 |
| JP | 2004-354572 A | 12/2004 |
| JP | 2007-25499 A | 2/2007 |
| JP | 2007-249073 A | 9/2007 |

* cited by examiner

*Primary Examiner*—Evelyn A. Lester
(74) *Attorney, Agent, or Firm*—Birch, Stewart, Kolasch & Birch, LLP

(57) ABSTRACT

It is provided that an imaging lens having satisfactory optical performances and being reduced in size and cost. The imaging lens includes in order from an object side, a negative first lens, a negative second lens, a positive third lens, a stop, a positive fourth lens and a negative fifth lens L5. And the focal length f3 of the third lens at d-line, the focal length f of the whole system at d-line satisfy $3.0 < f3/f < 4.5$.

20 Claims, 7 Drawing Sheets

EXAMPLE 1

EXAMPLE 2

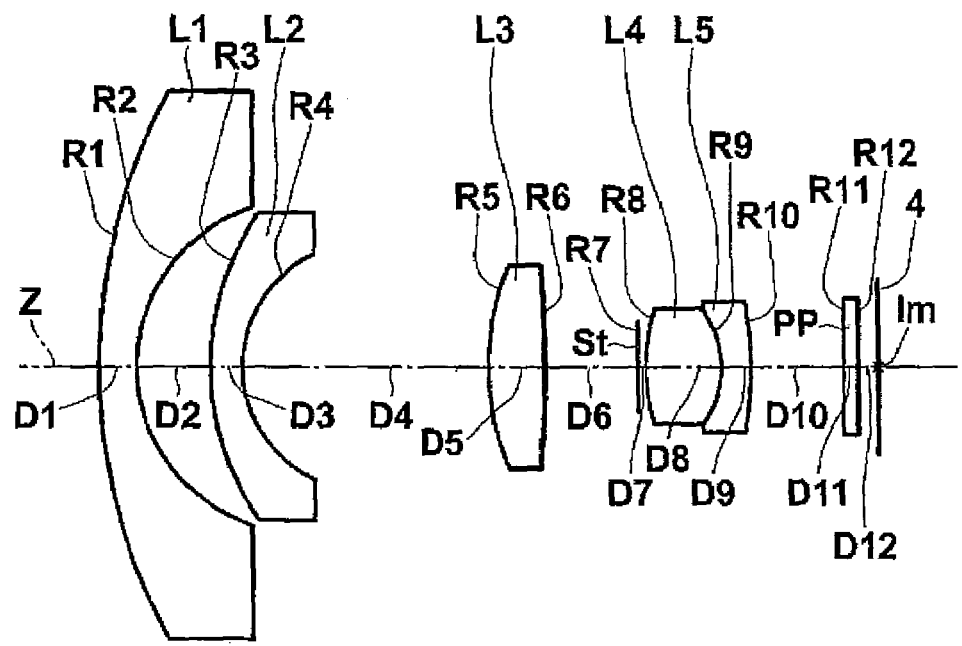
FIG. 4  EXAMPLE 3
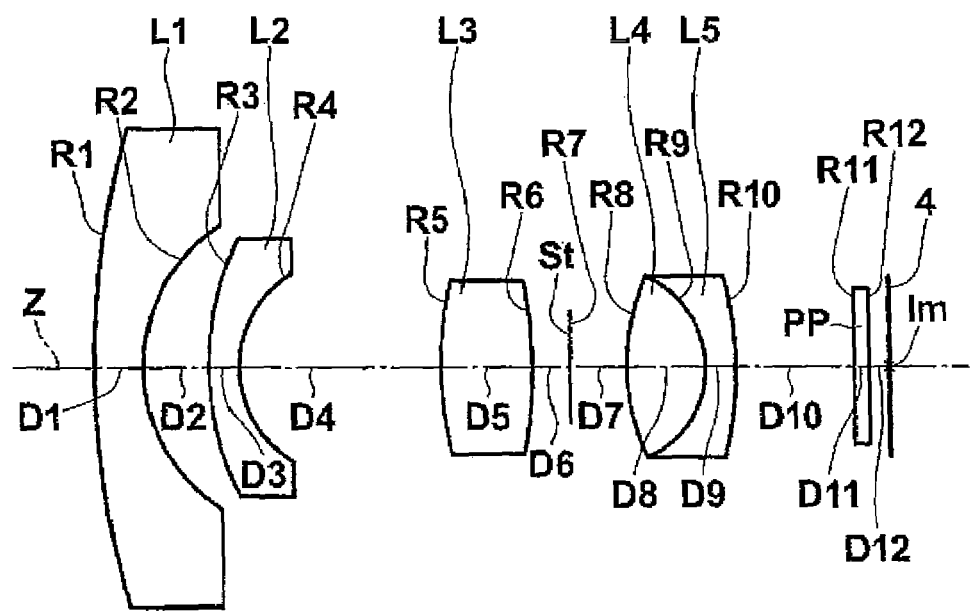
FIG. 5  EXAMPLE 4

EXAMPLE 5

EXAMPLE 1

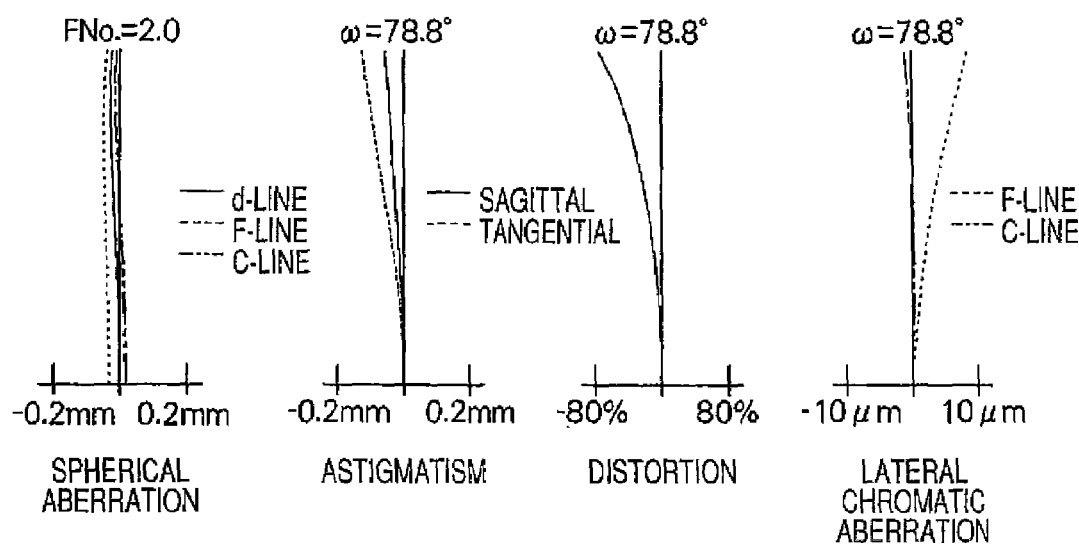
FIG. 10 EXAMPLE 4
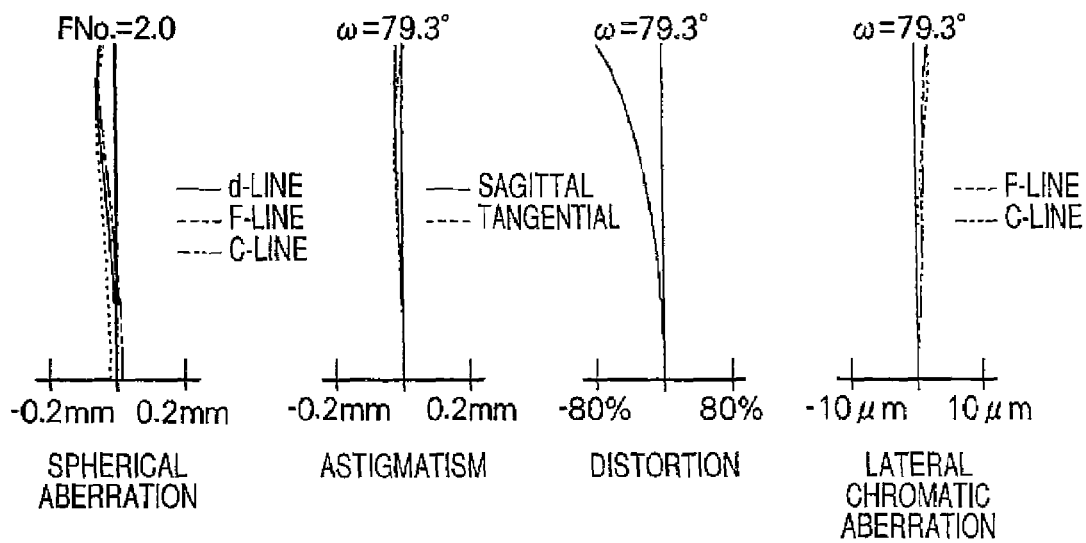
FIG. 11 EXAMPLE 5

IMAGING LENS AND IMAGING DEVICE

CROSS-REFERENCE TO RELATED APPLICATIONS

This application is based on and claims priority under 35 USC 119 from Japanese Patent Application No. 2007-176947 filed Jul. 5, 2007 and Japanese patent Application No. 2008-144372 filed Jun. 2, 2008.

BACKGROUND

1. Technical Field

The present invention relates to an imaging lens and an imaging device and, more particularly, to both an imaging lens suited for use in a vehicle-mounted camera, a portable terminal camera, a monitoring camera or a on-board camera using an imaging element of CCD (Charge Coupled Device), CMOS(Complementary Metal Oxide Semiconductor) or the like, and an imaging device having the imaging lens.

2. Related Art

In recent years, the imaging device of the CCD or CMOS is remarkably advancing in size reduction and in high pixel density. Accordingly, the imaging device body having those imaging elements is being reduced in size so that the imaging lens to be mounted is desired to be reduced in size and weight.

In the vehicle mounted camera or the monitoring camera, on the other hand, there has been demanded a lens which can be used over a wide temperature range while having high weather resistances to the ambient air in a cold country to a vehicle compartment in summer in the tropical districts and which is small-sized but can enjoy a wide angle and high performances.

As the imaging lens of the aforementioned field, the Applicant has proposed the imaging lenses having six and seven lens components while intending the size reduction and the angle widening in Japanese Patent Application Number 2007-011288 (not yet published). The imaging lenses known in the prior art and belonging to the aforementioned field are described in the following Patent Documents 1 to 3. Patent Document 1 (U.S. Pat. No. 7,023,628) described a wide-angle lens of six lens components having first and second negative meniscus lenses. Patent Document 2 (JP Hei. 10-039206 A) described an imaging lens of five components having negative first and second lenses and a diaphragm arranged on the image side farther from the lens closest to the image. Patent Document 3 (U.S. Pat. No. 4,525,038) describes a wide-angle lens of five lens components and for use in a photographic system.

In recent years, however, not only the further size reduction but also the cost reduction is desired, and the aforementioned constitutions of six and seven components are desired to reduce the lens number. The lens constitution described in Patent Document 2 is composed of five lenses, but the diaphragm position is close to the image plane so that the light ray height in the lens on the side closest to the object increases to enlarge the lens diameter. Especially in the vehicle-mounted camera, it is preferred that the exposure area of the lens surface is small, and accordingly that the diameter is small.

In view of the aforementioned described, the present invention has an object to provide an imaging lens which can be reduced in size and cost while holding the satisfactory optical performances, and an imaging device having that imaging lens.

SUMMARY

According to an aspect of the invention, an first imaging lens includes in order from an object side, a negative first lens, a negative second lens, a positive third lens, a stop, a positive fourth lens, and a negative fifth lens. The following Conditional Expression (1) is satisfied:

$$3.0 < f3/f < 4.5 \quad (1)$$

where f3 denotes a focal length of the third lens, and f denotes a focal length of the imaging lens.

According to the first imaging lens, in the lens system having a simple constitution including at least five lenses as a whole, the performances advantageous in size and cost reductions can be achieved while holding the satisfactory optical performances, by selecting the power arrangements, the constitutions of the respective lenses and the position of the diaphragm properly. Especially by arranging the diaphragm between the third lens and the fourth lens, the effective diameter of the lens on the object side can be reduced to contribute the size reduction. By satisfying the Conditional Expression (1), moreover, the field curvature is satisfactorily corrected.

In the first imaging lens, it is preferred that the following Conditional Expression (2) is satisfied:

$$v3 < 45 \quad (2)$$

where $v3$ denotes an Abbe number of the third lens at the d-line.

According to another aspect of the invention, a second imaging lens includes in order from an object side: a negative first lens; a negative second lens; a positive third lens; a diaphragm; a positive fourth lens and a negative fifth lens. The following Conditional Expression (2-2) is satisfied:

$$v3 < 31 \quad (2\text{-}2)$$

where $v3$ denotes an Abbe number of the third lens at the d-line.

According to the second imaging lens, in the lens system having a simple constitution including at least five lenses as a whole, the performances advantageous in size and cost reductions can be achieved while holding the satisfactory optical performances, by selecting the power arrangements and the constitutions of the respective lenses properly. Especially by arranging the diaphragm between the third lens and the fourth lens, the effective diameter of the lens on the object side can be reduced to contribute the size reduction. By satisfying the Conditional Expression (2-2), moreover, the lateral chromatic aberration is satisfactorily corrected.

In the first and second imaging lens, it is preferred that the following Conditional Expression (3) is satisfied:

$$2.5 < (D4+D5)/f < 5.5 \quad (3)$$

where D4 denotes a spacing between the second lens and the third lens on the optical axis, and D5 denotes a thickness of the third lens on the optical axis.

In the first and second imaging lens, the fourth lens and the fifth lens may be cemented to each other.

In the first and second imaging lens, it is preferred that the following Conditional Expressions (4) and (5) are satisfied:

$$0.05 < N5 - N4 < 0.40 \quad (4)$$

$$1.5 < v4/v5 \quad (5)$$

where N4 denotes refractive index of the fourth lens at d-line, ν4 denotes an Abbe number of the fourth lens at the d-line, N5 denotes a refractive index of the fifth lens at the d-line, and ν5 denotes an Abbe number of the fifth lens at the d-line.

In the first and second imaging lens it is preferred that the following Conditional Expression (6) is satisfied:

$$7 < L/f < 14 \tag{6}$$

where L denotes a distance on the optical axis from a surface of the first lens on the object side to the image plane.

Here, when the distance L is calculated, the air-converted distance is used for the distance (or the back focus) from the surface on the image side to the image plane of the fifth lens.

Here, the respective values of the aforementioned Conditional Expressions (1) to (6) and (2-2) use the reference wavelength, and the reference wavelength is used so long as otherwise specified herein.

According to still another aspect of the invention, an imaging device includes one of the aforementioned imaging lenses; and an imaging element that converts an optical image formed by the imaging lens, into an electric signal.

According to the first imaging lens, although the lens number is as small as five, the position of the diaphragm and the constitution of the respective lenses for such as refractive powers are so suitably set as to satisfy the Conditional Expression (1). Thus, the performances advantageous in size and cost reductions can be achieved while holding the satisfactory optical performances.

According to the second imaging lens, although the lens number is as small as five, the position of the diaphragm and the constitution of the respective lenses for such as refractive powers are so suitably set as to satisfy the Conditional Expression (2-2). Thus, the performances advantageous in size and cost reductions can be achieved while holding the satisfactory optical performances.

According to the imaging device, since the imaging device including the first or second imaging lens, satisfactory images can be obtained and the imaging device can be manufactured to be small in size and at low cost.

BRIEF DESCRIPTION OF THE DRAWINGS

FIG. 4 shows a sectional diagram showing a lens constitution of an imaging lens according to Example 3 of the invention.

FIG. 5 shows a sectional diagram showing a lens constitution of an imaging lens according to Example 4 of the invention.

FIG. 10 shows diagrams of the respective aberrations of the imaging lens according to Example 4 of the invention.

FIG. 11 shows diagrams of the respective aberrations of the imaging lens according to Example 5 of the invention.

DETAILED DESCRIPTION

Modes of embodiment of the invention are described in detail in the following with reference to the accompanying drawings. At first, with reference to FIG. 1, the description is made on the modes of embodiment of an imaging lens of the invention, and then on the modes of embodiment of an imaging device.

Figure 1:
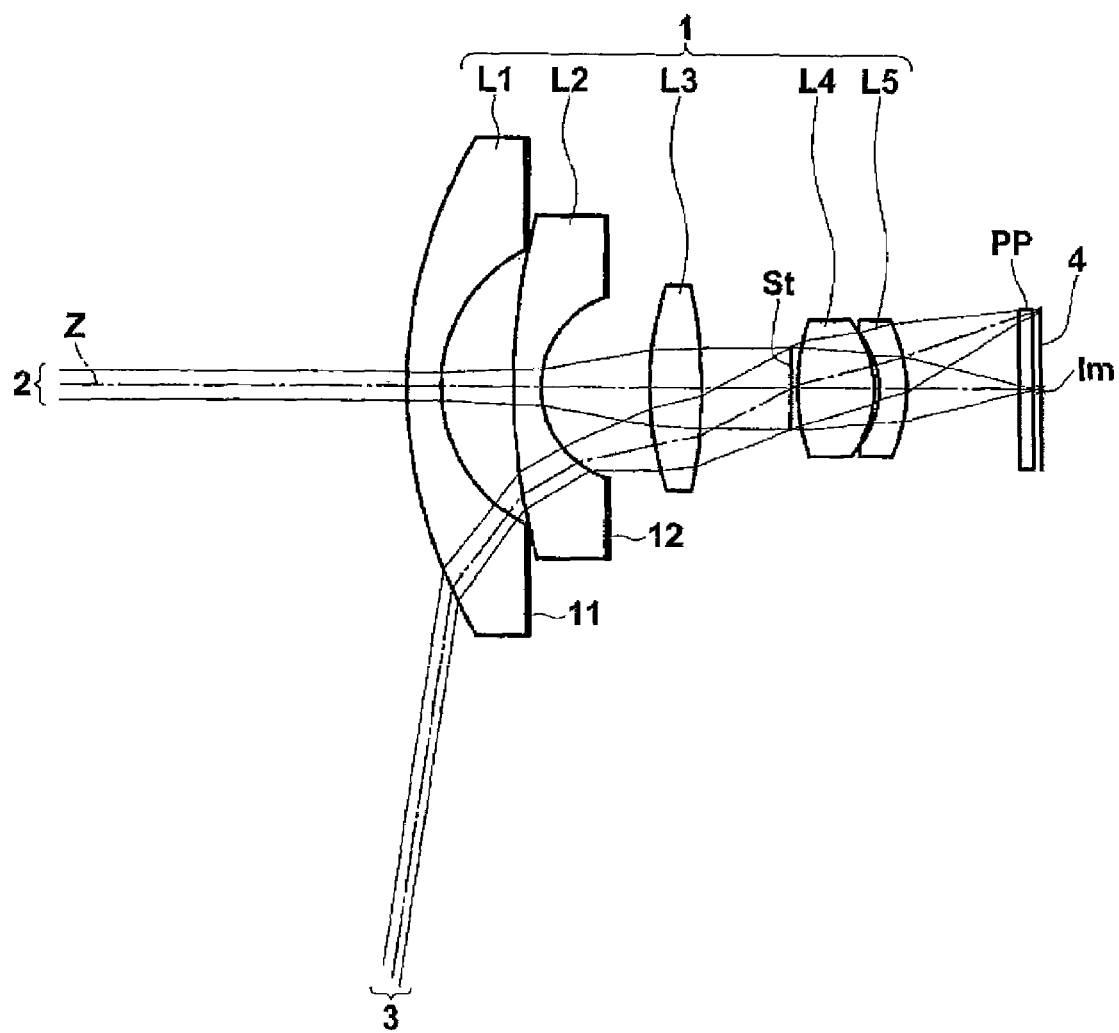
FIG. 1 shows an optical path diagram of an imaging lens according to one mode of an embodiment of the invention.

FIG. 1 presents a lens section of an imaging lens 1 according to one mode of embodiment of the invention. Here, the constitution example shown in FIG. 1 corresponds to the lens constitution of the later-described Example 1. FIG. 1 shows an on-axis light ray 2 and an off-axis light ray 3 to be incident at the maximum angle of view, together.

The imaging lens 1 is constituted by arranging in order from an object side along an optical axis Z, a negative first lens L1, a negative second lens L2, a positive third lens L3, an aperture diaphragm St, a positive fourth lens L4 and a negative fifth lens L5. Here, the aperture diaphragm St in FIG. 1 designates not the shape or size but the position on the optical axis Z.

Considering the case, in which the imaging lens 1 is applied to the imaging device, an imaging element 4 arranged in an image plane containing the image position Im of the imaging lens 1 is also shown in FIG. 1. The imaging element 4 converts the optical image formed by the imaging lens 1, into an electric signal, and is exemplified by a CCD image sensor.

When the imaging lens 1 is applied to the imaging device, it is preferred that a cover glass, a low-pass filter, an infrared ray cutting filter or the like is arranged between the fifth lens L5 and the image plane in accordance with the constitution of the camera side to be loaded with the lens. FIG. 1 shows an example, in which optical member PP of a parallel flat plate shape. For example, when the imaging lens 1 is applied to a vehicle-mounted camera and the vehicle-mounted camera is used as a night-vision camera which supports a driver's vision at night, a cutting filter which blocks light having a bandwidth ranging from ultraviolet to blue may be arranged between the lens system and the imaging element 4.

In addition, in place of arranging various filters such as a low-pass filter and a filter blocking light having a certain bandwidth, these various filters may be arranged between two lenses which lie next to each other included in the imaging lens 1. Coating having the same function as these various filters may be applied to any surface of the lenses included in the imaging lens 1.

As shown in FIG. 1, In general, the imaging lens 1 of this mode of embodiment having the negative-negative-positive-positive-negative power arrangement is one of a retrofocus type, so that the back focus can be made long and so that the half angle of view can be made as wide as about 80 degrees.

Moreover, the imaging lens 1 has its aperture diaphragm St arranged between the third lens L3 and the fourth lens L4 so that the light ray height in the lens on the object side can be reduced. In the lens of the same lens number as that of this mode of embodiment, as described in Patent Document 2, the aperture diaphragm is arranged on the image side of the fifth lens so that the light ray height at the lens on the object side is high. As compared with the lens described in Patent Document 2, therefore, the imaging lens 1 of this mode of embodiment can reduce the effective diameter of the lens on the object side so that it can be reduced in size, weight and cost.

In case the imaging lens 1 is applied to a vehicle-mounted camera, it is preferred that the lens unit to be exposed is as small as possible for appearances, that the camera to be installed in a vehicle shields the view of field of the driver as little as possible, and that the radial size is as small as possible.

Here, it is preferable that the imaging lens 1 of this mode of embodiment is constituted such that the following Conditional (1) is satisfied:

$$3.0 < f3/f < 4.5 \quad (1)$$

where f3 denotes a focal length of the third lens L3 and f denotes a focal length of the whole system.

If the value of f3/f exceeds the upper limit of the Conditional Expression (1), since the power of the third lens becomes weak, the imaging lens 1 can not correct the field curvature satisfactorily. If the value of f3/f falls below the lower limit of the Conditional Expression (1), it becomes difficult to assure a sufficient back-focus, and since the third lens L3 becomes more sensitive to decentration, it becomes difficult to set up the imaging lens 1.

Here, in order to correct the field curvature more satisfactorily, it is preferred that the imaging lens 1 further satisfies the following Conditional Expression (1-1):

$$3.0 < f3/f < 4.2 \quad (1-1)$$

In the imaging lens 1, moreover, it is preferred that the following Conditional Expression (2) is satisfied:

$$\nu 3 < 45 \quad (2)$$

where ν3 denotes an Abbe number of the third lens L3 at the d-line.

By selecting materials to satisfy the Conditional Expression (2), chromatic aberration, especially the lateral chromatic aberration can be satisfactorily corrected.

In order to correct the lateral chromatic aberration more satisfactorily, it is preferred that the following Conditional Expression (2-2) is satisfied:

$$\nu 3 < 31 \quad (2\text{-}2).$$

In order to suppress the lateral chromatic aberration at minimum, it is preferred that the following Conditional Expression (2-3) is satisfied:

$$\nu 3 < 28 \quad (2\text{-}3).$$

In the imaging lens 1, moreover, it is preferred that the following Conditional Expression (3) is satisfied:

$$2.5 < (D4+D5)/f < 5.5$$

where D4 denotes a distance between the second lens L2 and the third lens L3 in the optical axis, D5 denotes a thickness of the third lens L3 in the optical axis and f denotes the focal length f of the whole system.

By making the constitution to satisfy the Conditional Expression (3), the spherical aberration, the distortion and the comatic aberration can be satisfactorily corrected to acquire satisfactory performances. It is further possible to elongate the back focus and to enlarge the field angle.

If the value of (D4+D5)/f exceeds the upper limit of the Conditional Expression (3), the distance from the aperture diaphragm St to the first lens L1 is enlarged to increase the light ray height to transmit the first lens L1 so that the diameter of the first lens L1 is enlarged to be contrary to the size reduction. Moreover, the whole length of the lens system is enlarged to make the size reduction difficult.

If the value of (D4+D5)/f falls below the lower limit of the Conditional Expression (3), the spherical aberration and the comatic aberration cannot be satisfactorily corrected. Moreover, the focal length of the whole system is enlarged to make it difficult to acquire a bright optical system having a small F-number.

In the imaging lens 1, moreover, it is preferred that the following Conditional Expressions (4) and (5) are satisfied:

$$0.05 < N5 - N4 < 0.40 \quad (4)$$

$$1.5 < \nu 4/\nu 5 \quad (5)$$

where N4 denotes a refractive index N4 of the fourth lens L4 at the d-line, and ν4 denotes an Abbe number of the fourth lens L4 at the d-line, N5 denotes a refractive index of the fifth lens L5 at the d-line, and ν5 denotes an Abbe number of the fifth lens L5 at the d-line.

If the value of N5-N4 exceeds the Conditional Expression (4), the practically usable material is limited, and the usable material is so expensive as to become an obstacle to the cost reduction. If the value of N5-N4 falls below the Conditional Expression (4), the absolute value of the radius of curvature of the cemented surface becomes so small as to make the working difficult.

the value of ν4/ν5 falls below the Conditional Expression (5) it becomes difficult to correct the longitudinal chromatic aberration and the lateral chromatic aberration satisfactorily.

In the imaging lens 1, moreover, it is preferred that the following Conditional Expression (6) is satisfied:

$$7 < L/f < 14 \quad (6)$$

where f denotes the focal length of the whole system and L denotes on the optical axis from the surface of the first lens L1 on the object side to the image plane.

The Conditional Expression (6) is expression for achieving the size reduction and the wide angle simultaneously. If the value of L/f exceeds the upper limit of the Conditional Expression (6), the wide angle can be easily achieved, but the lens system is large-sized. If the value of L/f falls below the lower limit of the Conditional Expression (6), the lens system can be small-sized, but the wide angle is difficult to make.

In the imaging lens 1, moreover, it is preferred that the following Conditional Expression (7) is satisfied:

$$0.50 < D1/f \quad (7)$$

where f denotes the focal length of the whole system and D1 denotes a thickness of the first lens on the optical axis.

In case the imaging lens 1 is used for the vehicle-mounted application, for example, the first lens L1 is required to have strengths against various shocks. If the value of D1/f falls below the lower limit of the Conditional Expression (7), the first lens L1 becomes thin and fragile so that it is weak against the various shocks.

In the imaging lens 1, moreover, it is preferred that the following Conditional Expression (8) is satisfied:

$$2.0 < f45/f < 5.0 \quad (8)$$

where f denotes the focal length of the whole system and f45 denotes a combined focal length of the fourth lens L4 and the fifth lens L5.

If the value of f45/f exceeds the upper limit of the Conditional Expression (8), the combined refractive power of the fourth lens L4 and the fifth lens L5 becomes so weak that it becomes difficult to correct the chromatic aberration satisfactorily. If f45/f falls below the lower limit of the Conditional Expression (8), it becomes difficult to correct the field curvature satisfactorily.

In the imaging lens 1 of the constitutional example shown in FIG. 1, moreover, the first lens L1 is a negative meniscus lens having a convex surface directed toward the object side. As a result, a light ray of a large incidence angle can be caught by the object-side convex of the first lens L1 thereby to widen the angle of the optical system, and the luminous flux having emerged from the first lens L1 can be thinned to realize the size reduction. Moreover, both the first lens L1 and the second lens L2 are negative meniscus lenses so that the Petzval sum can be reduced to correct the field curvature all over the wide picture plane.

In the imaging lens 1, moreover, as in the constitutional example shown in FIG. 1, the third lens L3 is preferably made of a single lens having a biconvex shape. In this case, the field curvature can be more satisfactorily corrected.

In the constitutional example shown in FIG. 1, moreover, the third lens L3 is preferred to make the absolute value of the radius of curvature of the surface on the object side smaller than the absolute value of the radius of curvature of the surface on the image side. In this case, the field curvature can be still more satisfactorily corrected.

In the imaging lens 1, the positive fourth lens L4 and the negative fifth lens t5 are arranged closer to the image side than the aperture diaphragm St, so that the lateral chromatic aberration and the longitudinal chromatic aberration can be satisfactorily corrected. Especially in the constitutional example shown in FIG. 1, the chromatic aberration can be satisfactorily corrected by making the fourth lens L4 of a biconvex shape and the fifth lens L5 of a meniscus shape.

Here in the imaging lens 1 shown in FIG. 1, the fourth lens L4 and the fifth lens L5 are not cemented, but may also be cemented as in the later-described Examples 2 to 5. By this cementing constitution, not only the longitudinal chromatic aberration but also the lateral chromatic aberration can be easily corrected to satisfactory extents, and the whole length of the lens system in the optical axis direction can be reduced to contribute to the size reduction.

The imaging lens 1 thus constituted can enlarge the F-number so that it finds suitable application for taking moving images. Moreover, as shown in FIG. 1, the imaging lens 1 of this embodiment can have a higher telecentricity than that of the lens described in Patent Document 3 so that it finds more preferable photography using the solid imaging element than that of the lens described in Patent Document 3.

Here, the first lens L1 is located closest to the object side. In case the first lens L1 used in the severe environment such as the vehicle-mounted camera, it is preferably made of a material which is resistant to the surface deterioration by the weather, the temperature change by the direct sunlight, or the chemical agents such as oils and fats or detergents, that is, which is high in water resistance, weather resistance, acid resistance and chemical resistances. Moreover, the material preferable for the first lens L1 is hard and unbreakable, and is exemplified by glass or transparent ceramics. The ceramics have properties higher in strength and heat-resistance than ordinary glass.

The imaging lens 1 is required, in case it is applied to the vehicle-mounted camera, for example, to be used over a wide temperature range from ambient air in a cold country to a vehicular compartment in a tropical country. These requirements make it preferable that all the lenses are made of glasses. Specifically, it is preferred that the imaging lens 1 can be used over a wide temperature range from −40 degrees centigrade to 125 degrees centigrade. For manufacturing the lenses inexpensively, moreover, it is preferred that all the lenses are spherical lenses.

In the imaging lens 1, the luminous flux to pass outside of the effective radius between the first lens L1 and the second lens L2 may arrive as a stray light at the image plane and may become a ghost. The luminous flux to pass the outer side of the luminous flux 3 may stray. It is, therefore, preferred that the stray light is blocked by providing shielding portion 11 between the first lens L1 and the second lens L2. This shielding portion 11 may be exemplified by applying an opaque paint to the portion outside of the effective radius of the image side of the first lens L1, or by mounting an opaque plate member on the same portion. Alternatively, the shielding portions may also be exemplified by disposing the opaque plate member in the optical path of the luminous flux to become the stray light. The shielding portion for this purpose is arranged not only between the first lens L1 and the second lens L2 but also between other lenses, if necessary. FIG. 1 shows an example, in which shielding portion 12 of a constitution like that of the shielding portion 11 is also applied to the portion outside of the effective radius on the image side of the second lens L2.

Next, the description is made on the specific numerical examples of the imaging lens 1 according to the invention.

EXAMPLE 1

The lens data and the various data of the imaging lens according to Example 1 are tabulated in Table 1. In the lens data of Table 1, the surface number indicates the i-th order (i=1, 2, 3, . . . ) consecutively increasing to the image side from the 1st surface of the imaging lens closest to the object side. Here, the lens data of Table 1 contains the aperture diaphragm St and the optical members PP.

In Table 1, Rj designates the radius of curvature of the i-th (i=1, 2, 3, . . . ) surface, and Di designates a spacing on the optical axis Z between the i-th (i=1, 2, 3, . . . ) surface and the (i+1)-th surface. Moreover, Ndj designates such a refractive index of the j-th (J=1, 2, 3, . . . ) optical element at the d-line as increases gradually to the image side from the first optical element closest to the object, and vdj designates the Abbe number of the j-th optical element at the d-line. In Table 1, the radius of curvature and the spacing are expressed by the unit of mm, and the radius of curvature is made positive, in case the lens is convex to the object side, and negative in case the lens is convex to the image side.

In the various data of Table 1, SNo. designates a surface number; AP designates an aperture diaphragm; IM designates an image plane; FNo. designates an F-number; ω designates a half angle of view; IH designates an image height; Bf designates an air-converted back focus; L designates the distance (air-converted for the back focus) on the optical axis Z of the whole system from the surface of the first lens L1 closet to the object side to the image plane; f designates the focal length of the whole system; f1 designates the focal length of the first lens L1; f2 designates the focal length of the second lens L2; f3 designates the focal length of the third lens L3; f4 designates the focal length of the fourth lens L4; f5 designates the focal length of the fifth lens L5; and f45 designates the combined focal length of the fourth lens L4 and the fifth lens L5. In the various data of Table 1, ω has a unit of degree, and the data other than FNo. and ω have a unit of mm. Here, the designations of the symbols in Table 1 are similar to those of Examples, as follow.

TABLE 1

Lens Data

| SNo. | Ri | Di | Ndj | νdj |
|---|---|---|---|---|
| 1 | 13.95 | 1.00 | 1.7725 | 49.6 |
| 2 | 4.44 | 2.16 | | |
| 3 | 19.17 | 0.80 | 1.7725 | 49.6 |
| 4 | 2.81 | 3.12 | | |
| 5 | 9.53 | 1.50 | 1.8467 | 23.8 |
| 6 | −14.78 | 2.58 | | |
| 7 (AP) | ∞ | 0.20 | | |
| 8 | 6.38 | 2.25 | 1.8160 | 46.6 |
| 9 | −3.20 | 0.14 | | |
| 10 | −2.60 | 0.80 | 1.9229 | 18.9 |
| 11 | −4.57 | 3.04 | | |
| 12 | ∞ | 0.40 | 1.5168 | 64.2 |
| 13 | ∞ | 0.50 | | |
| 14 (IM) | ∞ | | | |

Various Data

| | |
|---|---|
| FNo. | 2.0 |
| ω | 80.3 |
| IH | 2.34 |
| Bf | 3.80 |
| L | 18.36 |
| f | 1.76 |
| $f_1$ | −8.85 |
| $f_2$ | −4.36 |
| $f_3$ | 7.04 |
| $f_4$ | 2.92 |
| $f_5$ | −8.11 |
| $f_{45}$ | 4.63 |

Figure 2:
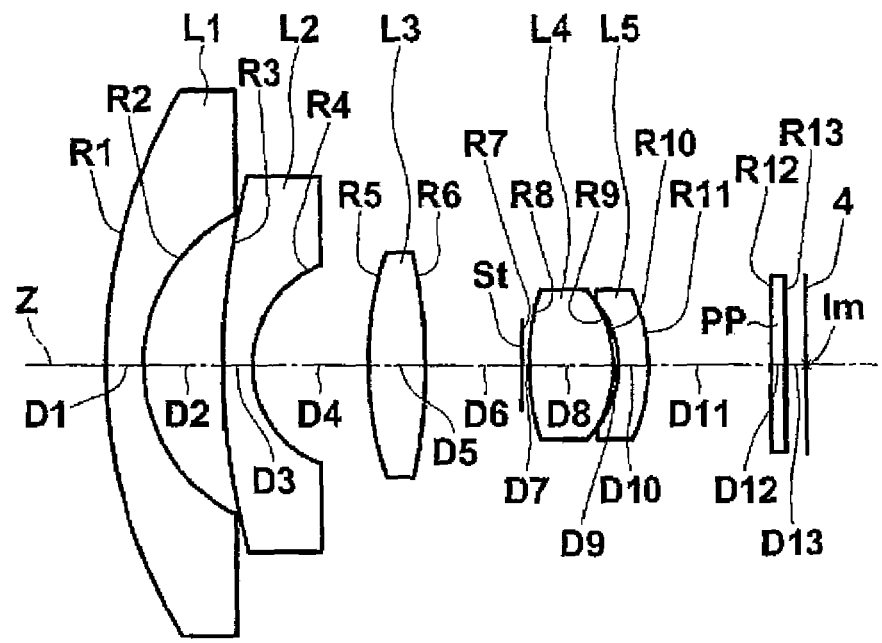
FIG. 2 shows a sectional diagram showing a lens constitution of an imaging lens according to Example 1 of the invention.

The lens constituting diagram of Example 1 is shown in FIG. 2. Reference characters Ri and Di (i=1, 2, 3, . . . ) in FIG. 2 correspond to Ri and Di in Table 1. Reference characters in FIG. 2 are designated to contain the aperture diaphragm St and the optical members PP. Here, the aperture diaphragm St in FIG. 2 designates not the shape or size but the position on the optical axis Z.

The imaging lens of Example 1, as shown in FIG. 2, is constituted of five groups and five lenses, but the imaging lenses of Examples 2 to 5, as described in the following, are constituted of four groups and five lenses, in which the fourth lens L4 and the fifth lens L5 are cemented.

EXAMPLE 2

Figure 3:
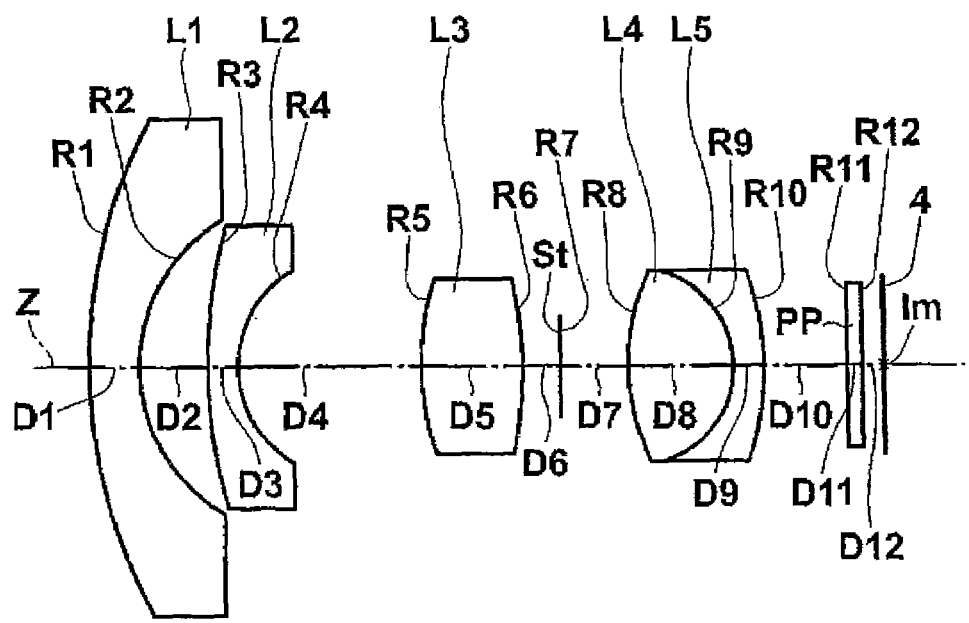
FIG. 3 shows a sectional diagram showing a lens constitution of an imaging lens according to Example 2 of the invention.

The lens data and the various data of the imaging lens according to Example 2 are tabulated in Table 2, and the lens constituting diagram is shown in FIG. 3. In FIG. 3, reference characters Ri and Di correspond to Ri and Di in Table 2.

TABLE 2

Lens Data

| SNo. | Ri | Di | Ndj | νdj |
|---|---|---|---|---|
| 1 | 13.77 | 1.30 | 1.7725 | 49.6 |
| 2 | 4.45 | 1.82 | | |
| 3 | 13.64 | 0.80 | 1.8348 | 42.7 |
| 4 | 2.88 | 4.92 | | |
| 5 | 7.78 | 2.64 | 1.8061 | 40.9 |
| 6 | −10.88 | 1.00 | | |
| 7 (AP) | ∞ | 1.79 | | |
| 8 | 5.75 | 2.78 | 1.7130 | 53.9 |
| 9 | −2.60 | 0.80 | 1.9229 | 18.9 |
| 10 | −7.31 | 2.26 | | |
| 11 | ∞ | 0.40 | 1.5168 | 64.2 |
| 12 | ∞ | 0.50 | | |
| 13 (IM) | ∞ | | | |

Various Data

| | |
|---|---|
| FNo. | 2.0 |
| ω | 80.4 |
| IH | 2.34 |
| Bf | 3.03 |
| L | 20.88 |
| f | 1.76 |
| $f_1$ | −9.05 |
| $f_2$ | −4.53 |
| $f_3$ | 6.00 |
| $f_4$ | 2.91 |
| $f_5$ | −4.76 |
| $f_{45}$ | 6.36 |

EXAMPLE 3

The lens data and the various data of the imaging lens according to Example 3 are tabulated in Table 3, and the lens constituting diagram is shown in FIG. 4. In FIG. 4, reference characters Ri and Di correspond to Ri and Di in Table 3.

TABLE 3

Lens Data

| SNo. | Ri | Di | Ndj | νdj |
|---|---|---|---|---|
| 1 | 15.24 | 1.00 | 1.8348 | 42.7 |
| 2 | 4.44 | 1.94 | | |
| 3 | 7.17 | 0.84 | 1.8348 | 42.7 |
| 4 | 3.28 | 6.59 | | |
| 5 | 6.88 | 1.50 | 1.8348 | 42.7 |
| 6 | −36.13 | 2.46 | | |
| 7 (AP) | ∞ | 0.20 | | |
| 8 | 4.93 | 2.01 | 1.7130 | 53.9 |
| 9 | −2.60 | 0.80 | 1.9229 | 18.9 |
| 10 | −9.32 | 2.53 | | |
| 11 | ∞ | 0.40 | 1.5168 | 64.2 |
| 12 | ∞ | 0.50 | | |
| 13 (IM) | ∞ | | | |

Various Data

| | |
|---|---|
| FNo. | 2.0 |
| ω | 81.3 |
| IH | 2.34 |
| Bf | 3.03 |
| L | 20.63 |
| f | 1.77 |
| $f_1$ | −7.85 |
| $f_2$ | −8.05 |
| $f_3$ | 7.03 |
| $f_4$ | 2.69 |
| $f_5$ | −4.15 |
| $f_{45}$ | 6.39 |

EXAMPLE 4

The lens data and the various data of the imaging lens according to Example 4 are tabulated in Table 4, and the lens constituting diagram is shown in FIG. 5. In FIG. 5, reference characters Ri and Di correspond to Ri and Di in Table 4.

TABLE 4

Lens Data

| SNo. | Ri | Di | Ndj | νdj |
|---|---|---|---|---|
| 1 | 22.39 | 1.30 | 1.7725 | 49.6 |
| 2 | 4.45 | 1.69 | | |

TABLE 4-continued

| | | | | |
|---|---|---|---|---|
| 3 | 7.50 | 0.80 | 1.8348 | 42.7 |
| 4 | 2.85 | 5.32 | | |
| 5 | 8.54 | 2.47 | 1.7999 | 29.8 |
| 6 | −11.84 | 1.00 | | |
| 7 (AP) | ∞ | 1.47 | | |
| 8 | 5.76 | 2.05 | 1.7130 | 53.9 |
| 9 | −2.60 | 0.80 | 1.9229 | 18.9 |
| 10 | −9.45 | 3.21 | | |
| 11 | ∞ | 0.40 | 1.5168 | 64.2 |
| 12 | ∞ | 0.50 | | |
| 13 (IM) | ∞ | | | |

| Various Data | |
|---|---|
| FNo. | 2.0 |
| ω | 78.8 |
| IH | 2.34 |
| Bf | 3.98 |
| L | 20.88 |
| f | 1.92 |
| $f_1$ | −7.42 |
| $f_2$ | −5.97 |
| $f_3$ | 6.55 |
| $f_4$ | 2.80 |
| $f_5$ | −4.12 |
| $f_{45}$ | 7.35 |

EXAMPLE 5

Figure 6:
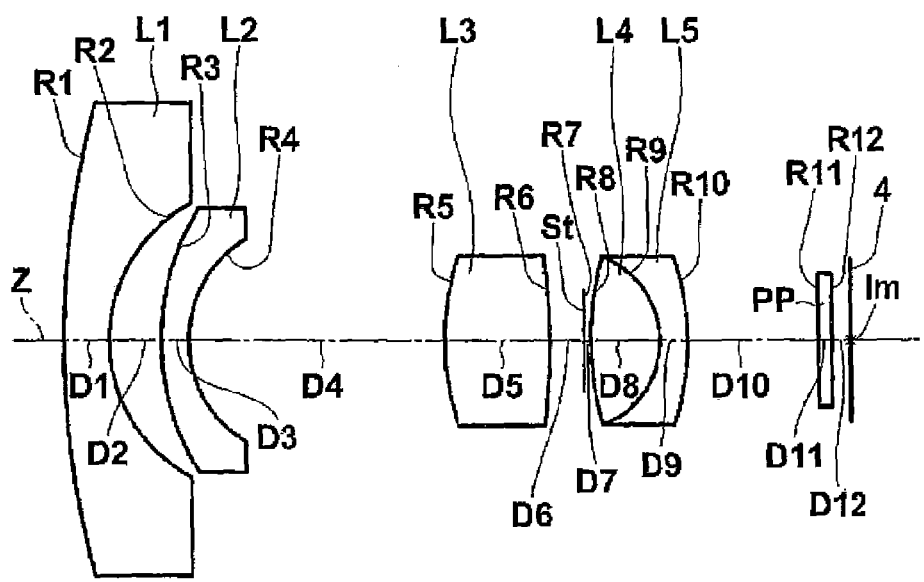
FIG. 6 shows a sectional diagram showing a lens constitution of an imaging lens according to Example 5 of the invention.
Figure 7:
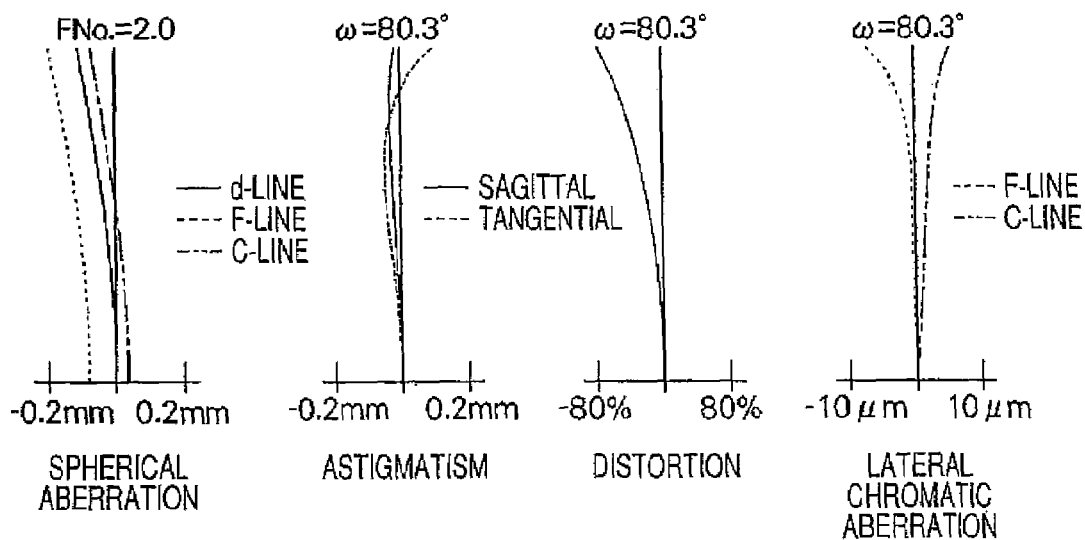
FIG. 7 shows diagrams of the respective aberrations of the imaging lens according to Example 1 of the invention.
Figure 8:
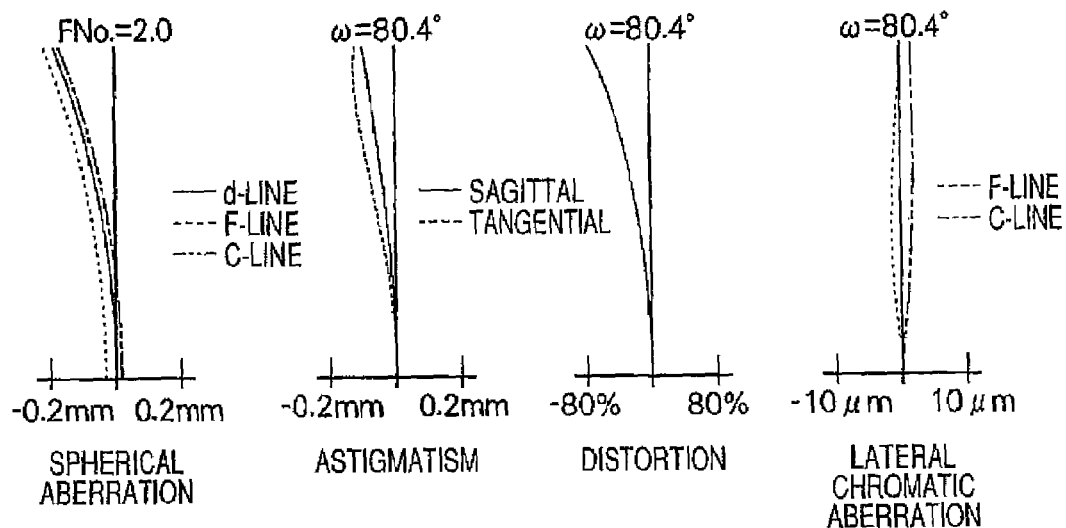
FIG. 8 shows diagrams of the respective aberrations of the imaging lens according to Example 2 of the invention.
Figure 9:
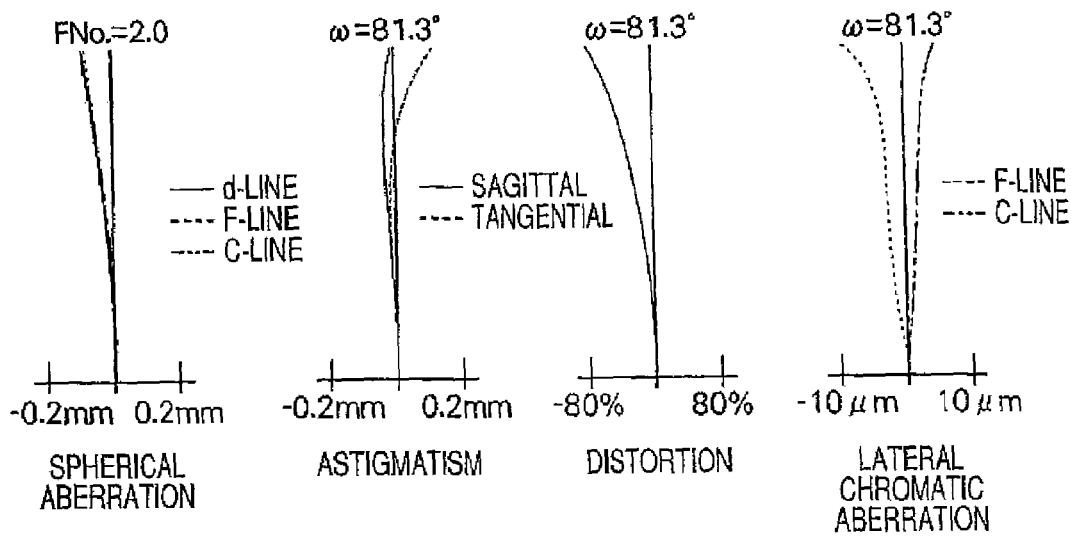
FIG. 9 shows diagrams of the respective aberrations of the imaging lens according to Example 3 of the invention.

The lens data and the various data of the imaging lens according to Example 5 are tabulated in Table 5, and the lens constituting diagram is shown in FIG. 6. In FIG. 6, reference characters Ri and Di correspond to Ri and Di in Table 5.

TABLE 5

| Lens Data | | | | |
|---|---|---|---|---|
| SNo. | Ri | Di | Ndj | vdj |
| 1 | 26.66 | 1.30 | 1.7550 | 52.3 |
| 2 | 4.47 | 1.50 | | |
| 3 | 7.09 | 0.80 | 1.7725 | 49.6 |
| 4 | 3.37 | 7.46 | | |
| 5 | 7.70 | 3.05 | 1.7999 | 29.8 |
| 6 | −19.11 | 1.00 | | |
| 7 (AP) | ∞ | 0.20 | | |
| 8 | 8.88 | 2.01 | 1.7130 | 53.9 |
| 9 | −2.60 | 0.80 | 1.9229 | 18.9 |
| 10 | −7.67 | 3.79 | | |
| 11 | ∞ | 0.40 | 1.5168 | 64.2 |
| 12 | ∞ | 0.50 | | |
| 13 (IM) | ∞ | | | |

| Various Data | |
|---|---|
| FNo. | 2.0 |
| ω | 79.3 |
| IH | 2.34 |
| Bf | 4.55 |
| L | 22.67 |
| f | 1.94 |
| $f_1$ | −7.30 |
| $f_2$ | −9.15 |
| $f_3$ | 7.23 |
| $f_4$ | 3.04 |
| $f_5$ | −4.61 |
| $f_{45}$ | 8.63 |

The values corresponding to the Conditional Expressions (1) to (8) in the imaging lenses of Examples 1 to 5 are tabulated in Table 6. each value in Table 6 is a value at the d-line (having a wavelength of 587.6 nm). As apparent from Table 6, Examples 1 to 5 satisfy all the Conditional Expressions (1), (2), (3), (4), (5), (6), (7), (8) and (1-1). And Examples 1, 4 and 5 satisfy the Conditional Expression (2-2). Further, Example 1 satisfy the Conditional Expression (2-3). Here, In Table 6, Cond designates Conditional Expression.

TABLE 6

| Cond | Example 1 | Example 2 | Example 3 | Example 4 | Example 5 |
|---|---|---|---|---|---|
| (1) $f_3/f$ | 4.00 | 3.40 | 3.97 | 3.42 | 3.72 |
| (2) $v_3$ | 23.8 | 40.9 | 42.7 | 29.8 | 29.8 |
| (3) $(D_4 + D_5)/f$ | 2.62 | 4.29 | 4.56 | 4.06 | 5.41 |
| (4) $N_5 - N_4$ | 0.11 | 0.21 | 0.21 | 0.21 | 0.21 |
| (5) $v_4/v_5$ | 2.47 | 2.85 | 2.85 | 2.85 | 2.85 |
| (6) $L/f$ | 10.42 | 11.83 | 11.64 | 10.39 | 11.67 |
| (7) $D_1/f$ | 0.57 | 0.74 | 0.56 | 0.68 | 0.67 |
| (8) $f_{45}/f$ | 2.63 | 3.60 | 3.60 | 3.83 | 4.45 |

The aberration diagrams of the spherical aberrations, the astigmatisms, the distortions, and the lateral chromatic aberrations of the imaging lenses according to Examples 1 to 5 are shown in FIG. 7 to FIG. 11, respectively. The respective aberration diagrams illustrate the aberrations with reference to the d-line, but the spherical aberration diagrams and the lateral chromatic aberration diagrams illustrate the aberrations with respect to the F-line (of a wavelength of 486.1 nm) and the C-line (of a wavelength of 656.3 nm)). The distortion diagrams illustrate the deviations from the ideal image height f×tan(θ). Here, f denotes the focal length of the whole system and θ is a variable number denoting an angle of view which is greater than or equal to 0 and less than or equal to ω (0≦θ23 ω). The FNo. of the ordinate of the spherical aberration diagram designates the F-number, and the value ω of the ordinate of other aberration diagrams designates the half angle of view. As seen from FIG. 7 to FIG. 11, Bright optical systems having the F-numbers of 2.0 shown in Example 1 to Example 5, and the respective aberrations are satisfactorily corrected. Thus these imaging lenses are suitably applied for taking moving images. On the other hand, the lens constitution described in Patent Document 3 also has five lenses, but cannot be said to be suitable for photographing moving images because it is a dark optical system with an F-number of 4.0.

The aforementioned imaging lens 1 and the imaging lenses of Examples 1 to 5 have half angle of view as wide as about 80 degrees but retain the satisfactory optical performances so that they can realize the size and cost reductions. Therefore, these lenses can be suitably employed in the vehicle-mounted camera for photographing the front, side and rear images of an automobile.

Figure 12:
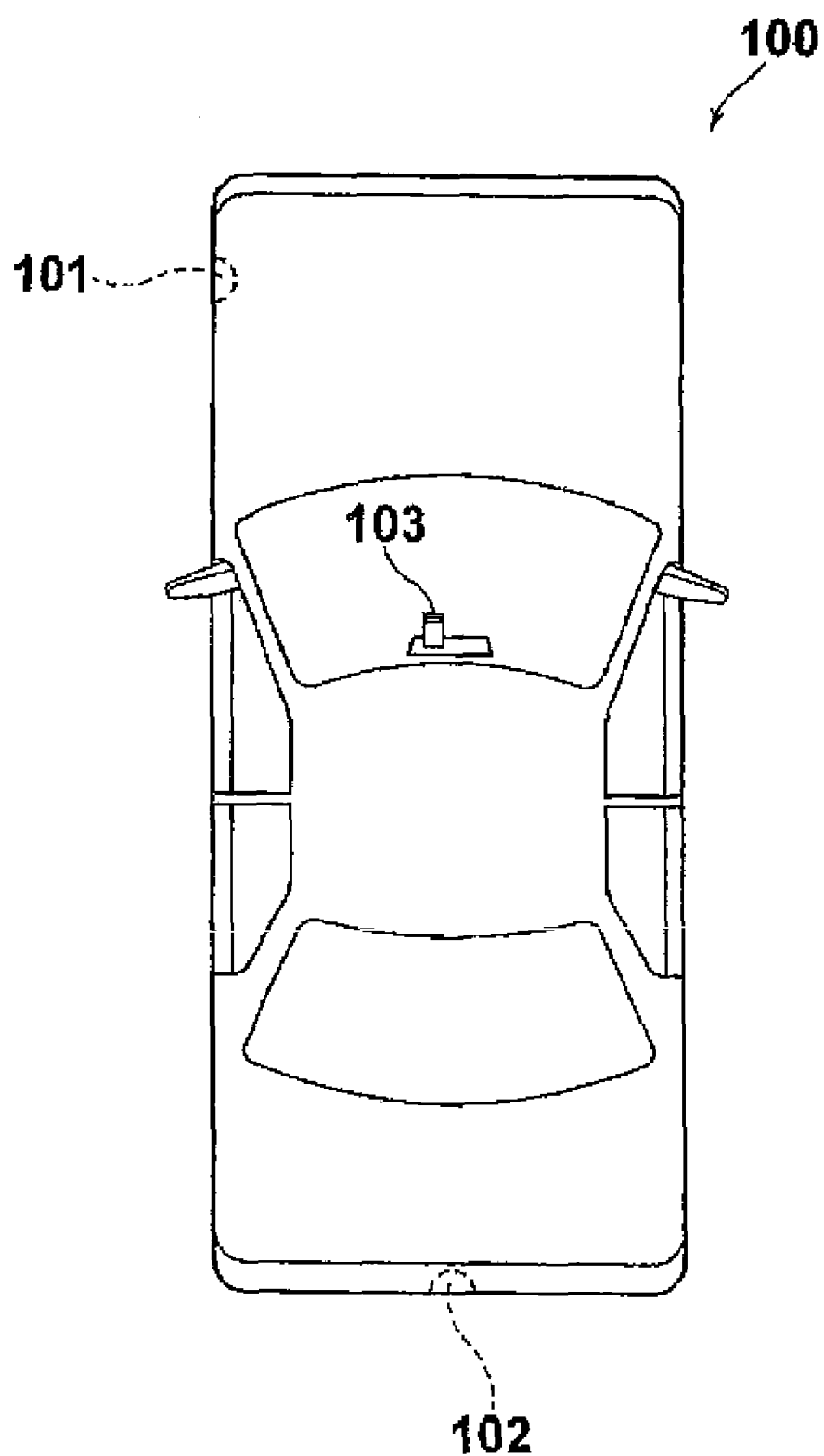
FIG. 12 shows a diagram for explaining the arrangement of vehicle-mounted imaging device according to one mode of an embodiment of the invention.

FIG. 12 shows a using example, in which the imaging lens and the imaging device of this mode of embodiment are mounted on an automobile 100. In FIG. 12, the automobile 100 is provided with an outside camera 101 for photographing the dead angle range of the side face of the assistant seat side thereof, an outside camera 102 for photographing the dead angle range of the back side of the automobile 100, and an inside camera 103 mounted on the back of the room mirror for photographing the same field of view of that of the driver. The outside camera 101, the outside camera 102 and the inside camera 103 are the imaging devices, which are individually equipped with the imaging lens 1 according to the embodiment of the invention, and the imaging element 4 for converting the optical image formed by the imaging lens 1, electric signals.

As described hereinbefore, the imaging lens 1 according to the embodiment of the invention is small-sized, although having the wide angle, and has satisfactory optical performances. As a result, the outside cameras 101 and 102 and the inside camera 103 can be small-sized so that satisfactory images can be focused over the wide field angle on the image surface of the imaging element 4. Moreover, the imaging lens 1 is small-sized and has a small number of lenses and can be inexpensively manufactured, so that the outside cameras 101 and 102 and the inside camera 103 can be inexpensively manufactured.

Although the invention has been described in connection with the modes of embodiment and the examples, the invention should not be limited to the foregoing modes of embodiment and the foregoing examples but could be varied in various manners. For example, the values of the radii of curvature, the spacing and the refractive indices should not be limited to the values of the aforementioned numerical examples but could take other values.

Moreover, the modes of embodiments of the imaging device have been described with reference to the drawings on the examples, in case of applying to the vehicle-mounted camera. However, the present invention should not be limited to that application, but could also be applied to a mobile terminal camera or a monitoring camera, for example.

What is claimed is:

1. An imaging lens comprising, in order from an object side:
    an imaging lens sequence consisting of a first lens, a second lens, a third lens, a fourth lens and a fifth lens, said first lens being a negative lens, said second lens being a negative lens, said third lens being a positive lens, said fourth lens being a positive lens, and said fifth lens being a negative lens; and
    a stop located between the third lens and the fourth lens, wherein the following Conditional Expression (1) is satisfied:

$$3.0 < f3/f < 4.5 \quad (1)$$

where f3 denotes a focal length of the third lens, and f denotes a focal length of the imaging lens.

2. The imaging lens according to claim 1, wherein the following Conditional Expression (2) is satisfied:

$$v3 < 45 \quad (2)$$

where v3 denotes an Abbe number of the third lens at the d-line.

3. The imaging lens according to claim 2, wherein the following Conditional Expression (3) is satisfied:

$$2.5 < (D4+D5)/f < 5.5 \quad (3)$$

where D4 denotes a spacing between the second lens and the third lens on the optical axis, and D5 denotes a thickness of the third lens on the optical axis.

4. The imaging lens according to claim 3, wherein the following Conditional Expressions (4) and (5) satisfied:

$$0.05 < N5 - N4 < 0.40 \quad (4)$$

$$1.5 < v4/v5 \quad (5)$$

where
    N4 denotes a refractive index of the fourth lens at the d-line,
    v4 denotes an Abbe number of the fourth lens at the d-line,
    N5 denotes a refractive index of the fifth lens at the d-line, and
    v5 denotes Abbe number of the fifth lens at the d-line.

5. The imaging lens according to claim 4, wherein the following Conditional Expression (6) is satisfied:

$$7 < L/f < 14 \quad (6)$$

where
    L denotes a distance on the optical axis from a surface of the first lens on the object side to the image plane.

6. The imaging lens according to claim 1, wherein the following Conditional Expression (3) is satisfied:

$$2.5 < (D4+D5)/f < 5.5 \quad (3)$$

where D4 denotes a spacing between the second lens and the third lens on the optical axis, and
    D5 denotes a thickness of the third lens on the optical axis.

7. The imaging lens according to claim 6, wherein the following Conditional Expressions (4) and (5) satisfied:

$$0.05 < N5 - N4 < 0.40 \quad (4)$$

$$1.5 < v4/v5 \quad (5)$$

where
    N4 denotes a refractive index of the fourth lens at the d-line,
    v4 denotes an Abbe number of the fourth lens at the d-line,
    N5 denotes a refractive index of the fifth lens at the d-line, and
    v5 denotes Abbe number of the fifth lens at the d-line.

8. The imaging lens according to claim 7, wherein the following Conditional Expression (6) is satisfied:

$$7 < L/f < 14 \quad (6)$$

where
    L denotes a distance on the optical axis from a surface of the first lens on the object side to the image plane.

9. The imaging lens according to claim 1, wherein the fourth lens and the fifth lens are cemented to each other.

10. The imaging lens according to claim 9, wherein the following Conditional Expressions (4) and (5) satisfied:

$$0.05 < N5 - N4 < 0.40 \quad (4)$$

$$1.5 < v4/v5 \quad (5)$$

where
    N4 denotes a refractive index of the fourth lens at the d-line,
    v4 denotes an Abbe number of the fourth lens at the d-line,
    N5 denotes a refractive index of the fifth lens at the d-line, and
    v5 denotes Abbe number of the fifth lens at the d-line.

11. The imaging lens according to claim 10, wherein the following Conditional Expression (6) is satisfied:

$$7 < L/f < 14 \quad (6)$$

where
    L denotes a distance on the optical axis from a surface of the first lens on the object side to the image plane.

12. The imaging lens according to claim 1, wherein the following Conditional Expressions (4) and (5) satisfied:

$$0.05 < N5 - N4 < 0.40 \quad (4)$$

$$1.5 < v4/v5 \quad (5)$$

where
N4 denotes a refractive index of the fourth lens at the d-line,
ν4 denotes an Abbe number of the fourth lens at the d-line,
N5 denotes a refractive index of the fifth lens at the d-line, and
ν5 denotes Abbe number of the fifth lens at the d-line.

13. The imaging lens according to claim 1,
wherein the following Conditional Expression (6) is satisfied:

$$7 < L/f < 14 \tag{6}$$

where
L denotes a distance on the optical axis from a surface of the first lens on the object side to the image plane.

14. An imaging device comprising:
an imaging lens of claim 1; and
an imaging element that converts an optical image formed by the imaging lens, into an electric signal.

15. An imaging lens comprising, in order from an object side:
an imaging lens sequence consisting of a first lens, a second lens, a third lens, a fourth lens and a fifth lens, said first lens being a negative lens, said second lens being a negative lens, said third lens being a positive lens, said fourth lens being a positive lens, and said fifth lens being a negative lens; and
a diaphragm located between the third lens and the fourth lens,
wherein the following Conditional Expression (2-2) is satisfied:

$$\nu 3 < 31 \tag{2-2}$$

where
ν3 denotes an Abbe number of the third lens at the d-line.

16. The imaging lens according to claim 15,
wherein the following Conditional Expression (3) is satisfied:

$$2.5 < (D4+D5)/f < 5.5 \tag{3}$$

where f denotes a focal length of the imaging lens, D4 denotes a spacing between the second lens and the third lens on the optical axis, and
D5 denotes a thickness of the third lens on the optical axis.

17. The imaging lens according to claim 15,
wherein the fourth lens and the fifth lens are cemented to each other.

18. The imaging lens according to claim 15,
wherein the following Conditional Expressions (4) and (5) satisfied:

$$0.05 < N5 - N4 < 0.40 \tag{4}$$

$$1.5 < \nu 4/\nu 5 \tag{5}$$

where
N4 denotes a refractive index of the fourth lens at the d-line,
ν4 denotes an Abbe number of the fourth lens at the d-line,
N5 denotes a refractive index of the fifth lens at the d-line, and
ν5 denotes Abbe number of the fifth lens at the d-line.

19. The imaging lens according to claim 15,
wherein the following Conditional Expression (6) is satisfied:

$$7 < L/f < 14 \tag{6}$$

where
f denotes a focal length of the imaging lens and L denotes a distance on the optical axis from a surface of the first lens on the object side to the image plane.

20. An imaging device comprising:
an imaging lens of claim 15; and
an imaging element that converts an optical image formed by the imaging lens, into an electric signal.

\* \* \* \* \*